(12) United States Patent
Holstege et al.

(10) Patent No.: US 8,935,267 B2
(45) Date of Patent: Jan. 13, 2015

(54) APPARATUS AND METHOD FOR EXECUTING DIFFERENT QUERY LANGUAGE QUERIES ON TREE STRUCTURED DATA USING PRE-COMPUTED INDICES OF SELECTIVE DOCUMENT PATHS

(75) Inventors: Mary Holstege, Cupertino, CA (US); Christopher Lindblad, Berkeley, CA (US); Gajanan Chinchwadkar, Fremont, CA (US)

(73) Assignee: Marklogic Corporation, San Carlos, CA (US)

( * ) Notice: Subject to any disclaimer, the term of this patent is extended or adjusted under 35 U.S.C. 154(b) by 107 days.

(21) Appl. No.: 13/527,522

(22) Filed: Jun. 19, 2012

(65) Prior Publication Data

US 2013/0339370 A1    Dec. 19, 2013

(51) Int. Cl.
*G06F 17/30*    (2006.01)
(52) U.S. Cl.
USPC ............ 707/756; 707/743; 707/711; 707/797
(58) Field of Classification Search
USPC .................................................. 707/706, 803
See application file for complete search history.

(56) References Cited

U.S. PATENT DOCUMENTS

| | | | |
|---|---|---|---|
| 6,925,470 B1* | 8/2005 | Sangudi et al. | 1/1 |
| 7,730,104 B2* | 6/2010 | Uchiyama et al. | 707/802 |
| 7,822,788 B2* | 10/2010 | Kanawa | 707/811 |
| 8,276,064 B2* | 9/2012 | Heifets et al. | 715/237 |
| 2002/0156772 A1* | 10/2002 | Chau et al. | 707/3 |
| 2005/0066271 A1* | 3/2005 | Uchiyama et al. | 715/513 |
| 2006/0004792 A1* | 1/2006 | Lyle et al. | 707/100 |
| 2007/0198559 A1* | 8/2007 | Hattori | 707/101 |
| 2008/0120321 A1* | 5/2008 | Liu et al. | 707/102 |
| 2010/0082587 A1* | 4/2010 | Hattori | 707/706 |
| 2010/0138442 A1* | 6/2010 | Shinkawa et al. | 707/769 |

OTHER PUBLICATIONS

Bray et al., ed. "Extensible Markup Language (XML) 1.0", Fifth Edition, World Wide Web Consortium, Nov. 26, 2008, http://www.w3.org/TR/xml, 63 pgs.

* cited by examiner

*Primary Examiner* — Debbie Le
(74) *Attorney, Agent, or Firm* — Cooley LLP

(57) ABSTRACT

A method of operating a tree structured database includes receiving a document, forming a top-down tree characterizing the document, generating pre-computed indices characterizing the document, combining subsets of the pre-computed indices to dynamically create a table of information characterizing the document, and resolving a structured query language query against the table to form collected data.

10 Claims, 9 Drawing Sheets

```
<names>
    <name>
        <first>John</first>
        <middle>James</middle>
        <last>Smith</last>
    </name>
    <name>
        <first>Ken</first>
        <middle>Bill</middle>
        <last>Wrangler</last>
    </name>
</names>
```

Element Range Index

| Value in Element | Document ID | Optional Position in Document |
|---|---|---|
| John | ID_1 | Position X |
| Ken | ID_2 | Position Y |

FIG. 6

Field Range Index 700

| Values | Document ID | Optional Position in Document |
|---|---|---|
| John Smith | ID_X | Position_1 |
| Ken Wrangler | ID_Y | Position_2 |

702 / 704 / 706; 708 → row 1; 710 → row 2

FIG. 7

Range Index Configuration Table 900

| Range Index Configuration Key (902) | Range Index Specification (910) |
|---|---|
| RI Config Key_1 | RI Spec_1 |
| RI Config Key_2 | RI Spec_2 |
| ⋮ | ⋮ |
| RI Config Key_N | RI Spec_N |

FIG. 9

APPARATUS AND METHOD FOR EXECUTING DIFFERENT QUERY LANGUAGE QUERIES ON TREE STRUCTURED DATA USING PRE-COMPUTED INDICES OF SELECTIVE DOCUMENT PATHS

FIELD OF THE INVENTION

This invention relates generally to digital information processing. More particularly, this invention relates to techniques for using pre-computed indices of selective document paths to support SQL queries on tree structured data.

BACKGROUND OF THE INVENTION

A variety of markup languages are known in the art. For example, Extensible Markup Language (XML) is a restricted form of SGML, the Standard Generalized Markup Language defined in ISO 8879 and XML is one form of structuring data. XML is more fully described in "Extensible Markup Language (XML) 1.0 (Fifth Edition)", W3C Recommendation (26 Nov. 2008), which is incorporated by reference herein for all purposes [and available at http://www.w3.org/TR/REC-xml/] (hereinafter, "XML Recommendation"). XML is a useful form of structuring data because it is an open format that is human-readable and machine-interpretable. Other structured languages without these features or with similar features might be used instead of XML, but XML is currently a popular structured language used to encapsulate (obtain, store, process, etc.) data in a structured manner.

An XML document has two parts: 1) a markup document and 2) a document schema. The markup document and the schema are made up of storage units called "elements", which can be nested to form a hierarchical structure. The following is an example of an XML markup document:

```
<citation publication_date=01/02/2012>
    <title>MarkLogic Query Language</title>
    <author>
        <last>Smith</last>
        <first>John</first>
    </author>
    <abstract>
```

The MarkLogic Query Language is a new book from MarkLogic Publishers that gives application programmers a thorough introductions to the MarkLogic query language.

```
    </abstract>
</citation>
```

This document contains data for one "citation" element. The "citation" element has within it a "title" element, and "author" element and an "abstract" element. In turn, the "author" element has within it a "last" element (last name of the author) and a "first" element (first name of the author). Thus, an XML document comprises text organized in freely-structured outline form with tags indicating the beginning and end of each outline element. Generally, an XML document comprises text organized in freely-structured outline form with tags indicating the beginning and end of each outline element. In XML, a tag is delimited with angle brackets followed by the tag's name, with the opening and closing tags distinguished by having the closing tag beginning with a forward slash after the initial angle bracket.

Elements can contain either parsed or unparsed data. Only parsed data is shown for the example document above. Unparsed data is made up of arbitrary character sequences. Parsed data is made up of characters, some of which form character data and some of which form markup. The markup encodes a description of the document's storage layout and logical structure. XML elements can have associated attributes in the form of name-value pairs, such as the publication date attribute of the "citation" element. The name-value pairs appear within the angle brackets of an XML tag, following the tag name.

XML schemas specify constraints on the structures and types of elements and attribute values in an XML document. The basic schema for XML is the XML Schema, which is described in "XML Schema Part 1: Structures Second Edition", W3C Recommendation (28 Oct. 2004), which is incorporated by reference herein for all purposes [and available at http://www.w3.org/TR/xmlschema-1/]. A previous and very widely used schema format is the DTD (Document Type Definition), which is described in the XML Recommendation.

Since XML documents are typically in text format, they can be searched using conventional text search tools. However, such tools might ignore the information content provided by the structure of the document, one of the key benefits of XML. Several query languages have been proposed for searching and reformatting XML documents that do consider the XML documents as structured documents. One such language is XQuery, which is described in "XQuery 1.0: An XML Query Language", W3C Recommendation (14 Dec. 2010), which is incorporated by reference herein for all purposes [and available at http://www.w3.org/TR/xquery].

XQuery is derived from an XML query language called Quilt [described at http://www.almaden.ibm.com/cs/people/chamberlin/quilt.html], which in turn borrowed features from several other languages, including XPath 1.0 [described at http://www.w3.org/TR/xpath], XQL [described at Http://www.w3.org/TandS/QL/QL98/pp/xql.html], XML-QL [described at http://www.research.att.com/.about.mfflfiles/final.html] and OQL.

Query languages predated the development of XML and many relational databases use a standardized query language called SQL, as described in ISO/IEC 9075-1:1999. The SQL language has established itself as the linquafranca for relational database management and provides the basis for systems interoperability, application portability, client/server operation, and distributed databases. XQuery is proposed to fulfill a similar role with respect to XML database systems. As XML becomes the standard for information exchange between peer data stores, and between client visualization tools and data servers, XQuery may become the standard method for storing and retrieving data from XML databases.

Notwithstanding the growing use of Xquery, SQL is still prevalently known and utilized. Much work has been done on the issue of SQL efficiency, such as how to process a SQL query, retrieve matching data and present that to the human or computer query issuer with efficient use of computing resources to allow responses to be quickly made to queries. Accordingly, it would be desirable to leverage SQL in connection with tree structured data, such as XML. Furthermore, it would be desirable to build a database that supports multiple query languages, such as XPath, XQuery, SQL, XSLT, Full-text search and a geospatial query language.

SUMMARY OF THE INVENTION

A method of operating a tree structured database includes receiving a document, forming a top-down tree characterizing the document, generating pre-computed indices characterizing the document, combining subsets of the pre-computed indices to dynamically create a table of information characterizing the document, and resolving a structured query language query against the table to form collected data.

A method of processing a query in a tree structured database includes resolving a structured query language query to a dynamically created table comprising a combination of pre-computed indices characterizing components of a top-down tree characterizing a document and collecting data from the dynamically created table that is responsive to the structured query language query.

A method of constructing a database includes receiving a document, forming a top-down tree characterizing the document to support structured document queries, generating pre-computed indices characterizing the document, and combining subsets of the pre-computed indices to dynamically create a table of information characterizing the document to support relational queries.

BRIEF DESCRIPTION OF THE FIGURES

The invention is more fully appreciated in connection with the following detailed description taken in conjunction with the accompanying drawings, in which:

FIG. 6 illustrates an element range index that may be utilized in accordance with an embodiment of the invention.

FIG. 7 illustrates a field range index that may be utilized in accordance with an embodiment of the invention.

FIG. 9 illustrates a range index configuration table utilized in accordance with an embodiment of the invention.

Like reference numerals refer to corresponding parts throughout the several views of the drawings.

DETAILED DESCRIPTION OF THE INVENTION

Figure 1:
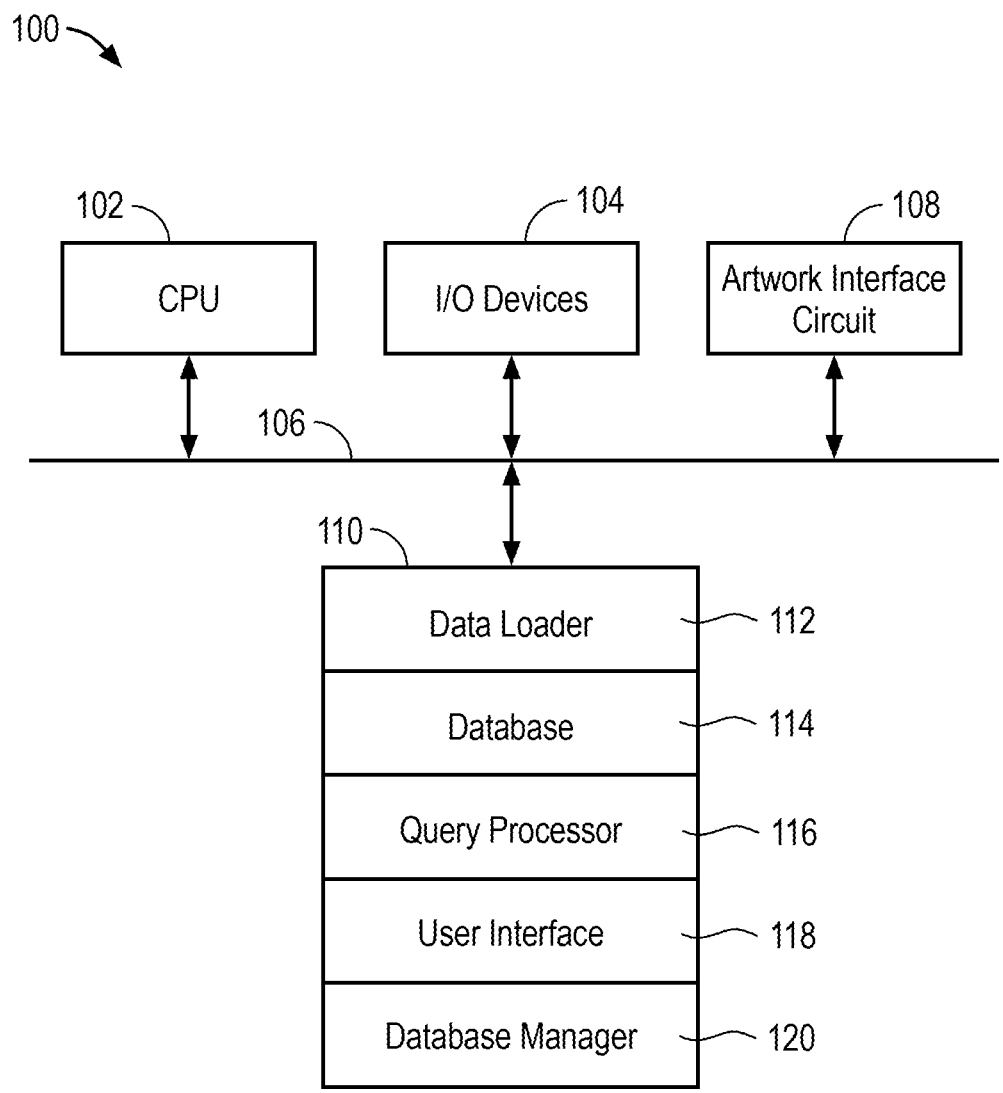
FIG. 1 is a computer configured to implement operations associated with an embodiment of the invention.

FIG. 1 illustrates a computer 100 configured in accordance with an embodiment of the invention. The computer 100 includes standard components, such as a central processing unit 102 and input/output devices 104 connected via a bus 106. The input/output devices may include a keyboard, mouse, display and the like. A network interface circuit 108 is also connected to the bus 106. Thus, the computer 100 may operate in a networked environment.

A memory 110 is also connected to the bus 106. The memory 110 includes data and executable instructions to implement operations of the invention. A data loader 112 includes executable instructions to process documents and form top-down trees and selective pre-computed indices, as described herein. These trees and indices are then stored in a tree structured database 114. A query processor 116 includes executable instructions to decompose a query and apply it against the database 114, as discussed below. A user interface 118 includes executable instructions to define an interface to coordinate operations of the invention. A database manager 120 includes executable instructions to perform various database management operations.

The modules in memory 110 are exemplary. These modules may be combined or be reduced into additional modules. The modules may be implemented on any number of machines in a networked environment. It is the operations of the invention that are significant, not the particular architecture by which the operations are implemented.

Figure 2:
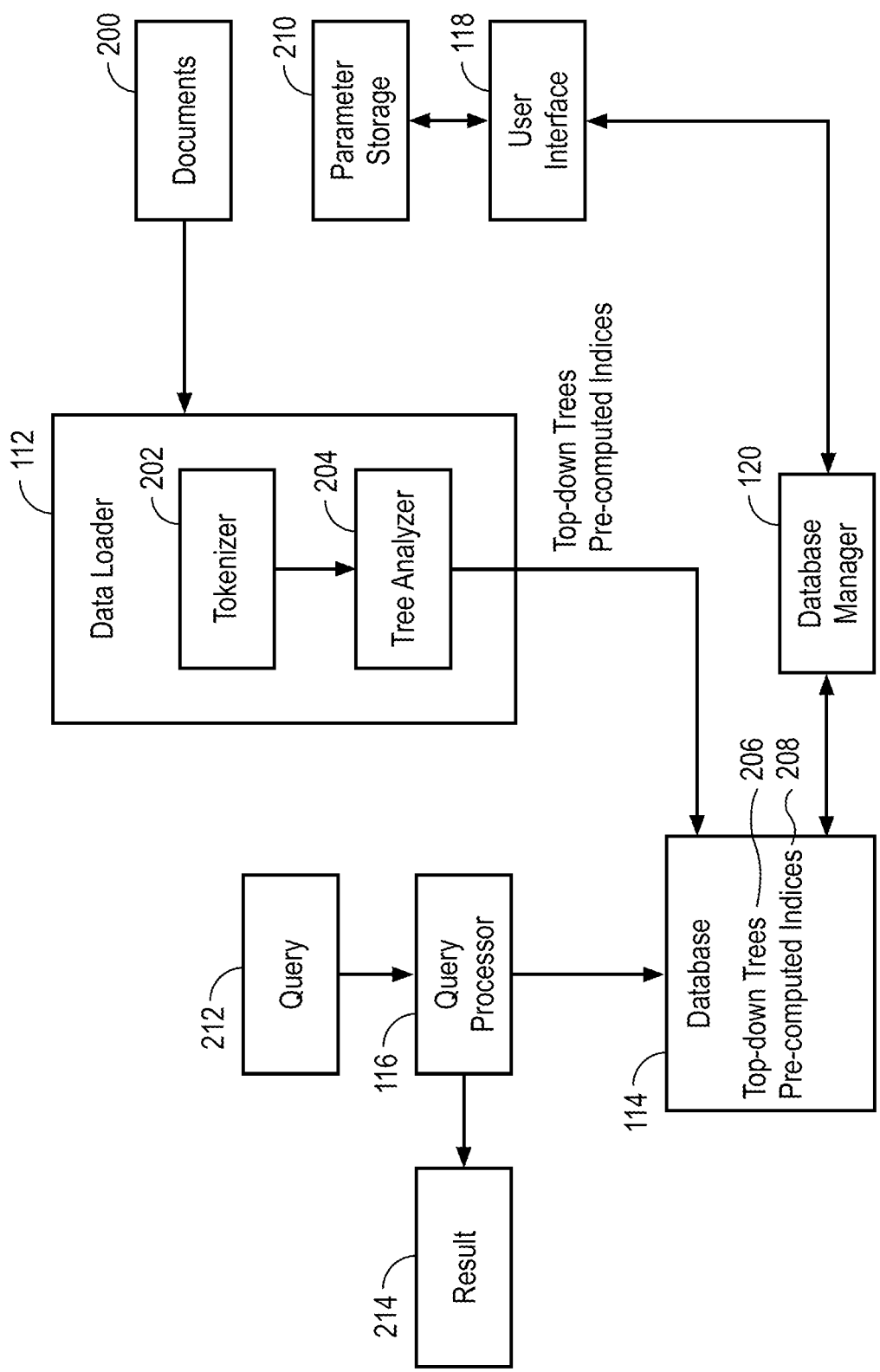
FIG. 2 illustrates the interoperability of different modules associated with an embodiment of the invention.

FIG. 2 illustrates interactions between components used to implement an embodiment of the invention. Documents 200 are delivered to the data loader 112. The data loader 112 may include a tokenizer 202, which includes executable instructions to produce tokens or segments for components in each document. A tree analyzer 204 includes executable instructions to form trees with the tokens and then analyze the trees. The tree analyzer forms a top-down tree for each document. The top-down tree characterizes the structure of a document from a root node through a set of fanned out nodes. The tree analyzer also develops a set of pre-computed indices. The term pre-computed indices is used to distinguish from indices formed in response to a query. The resultant top-down trees 206 and pre-computed indices 208 are separately searchable entities, which are loaded into a tree structured database 114. The top-down trees 206 support Xquery queries and other markup language queries. The pre-computed indices support multiple query languages, such as XQuery, XPath, XSLT, Full-text, Geospatial and SQL. Thus, the pre-computed indices support relational queries in a tree structured database, which otherwise does not support such queries.

While top-down trees have been used in the prior art to support various search mechanisms, the disclosed technology supplements such top-down trees with the pre-computed indices, which may be conveniently formulated while producing the top-down trees. As demonstrated below, the pre-computed indices allow table views to be formed, which may then be queried using standard SQL.

FIG. 2 also illustrates parameter storage 210. Parameter storage 210 stores path parameters for documents stored in the database 114. These path parameters may be used to define various levels of granular path expression and control. The path parameters may be expressed as default configuration path parameters defined in a file. Alternately, a user interface 118 may be used to prompt a user for the path parameters. The path parameters may include element paths and attribute paths. An element is a logical document component that either begins with a start-tag and ends with a matching end-tag or consists only of an empty-element tag. The characters between the start- and end-tags, if any, are the element's content and may contain markup, including other elements, which are called child elements. An example of an element is <Greeting>Hello, world.</Greeting>. An attribute is a markup construct comprising a name/value pair that exists within a start-tag or empty-element tag. In the following example the element img has two attributes, src and alt: <img src="madonna.jpg" alt='Foligno Madonna, by Raphael'/>. Another example is <step number="3">Connect A to B.</step> where the name of the attribute is "number" and the value is "3".

The database manager 120 is responsive to inputs from the user interface 118. The database manager 120 includes executable instructions to coordinate operations associated with the database 114.

FIG. 2 also illustrates a query processor 116, which receives a query 212 and produces a result 214. The query processor 116 parses the query 212 to produce a query plan. The query plan expresses a set of path constraints used to identify information responsive to the query. The path constraints are matched to separately searchable entities of the tree structured database. In particular, the path constraints are matched to top-down trees characterizing path structures for documents and pre-computed indices for nodes of the path structures for the documents.

Figure 3:
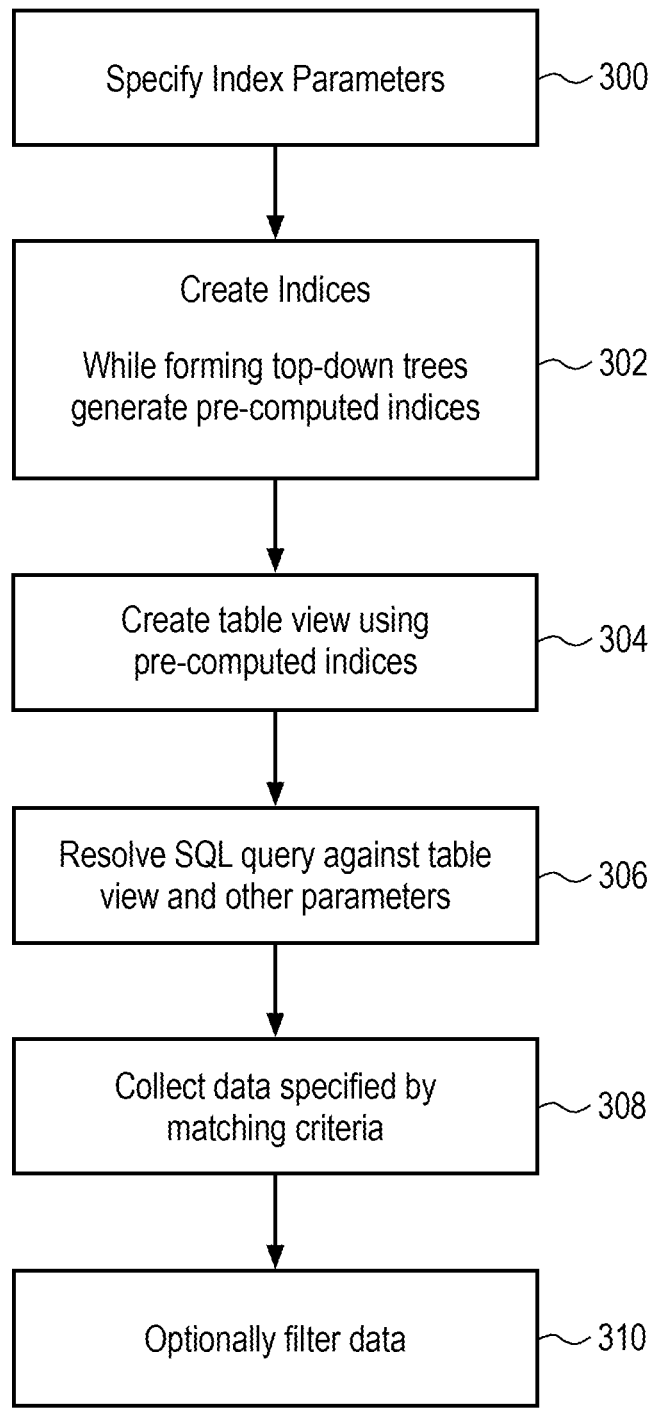
FIG. 3 illustrates general processing operations associated with an embodiment of the invention.

FIG. 3 illustrates processing operations associated with the components of FIG. 2. Initially, index parameters 300 are specified. The index parameters 300 may be specified through the user interface 118 or they may be specified in a default configuration file. Next, indices are created 302. That is, while forming top-down trees for documents, selective pre-computed indices are formed. One or more table views may then be defined using the pre-computed indices 304. That is, indices are mapped to columns of a table, as shown below.

A SQL query is then resolved against a table view 306. Observe here that a SQL query is being used in conjunction with a tree structured database. Further observe that the pre-computed indices represent the structure of ingested documents. Thus, re-ordering of data to form tables is not performed.

The next operation of FIG. 3 is to collect data specified by the matching criteria 306. The resultant data may then be filtered 308.

Figures 4, 5:
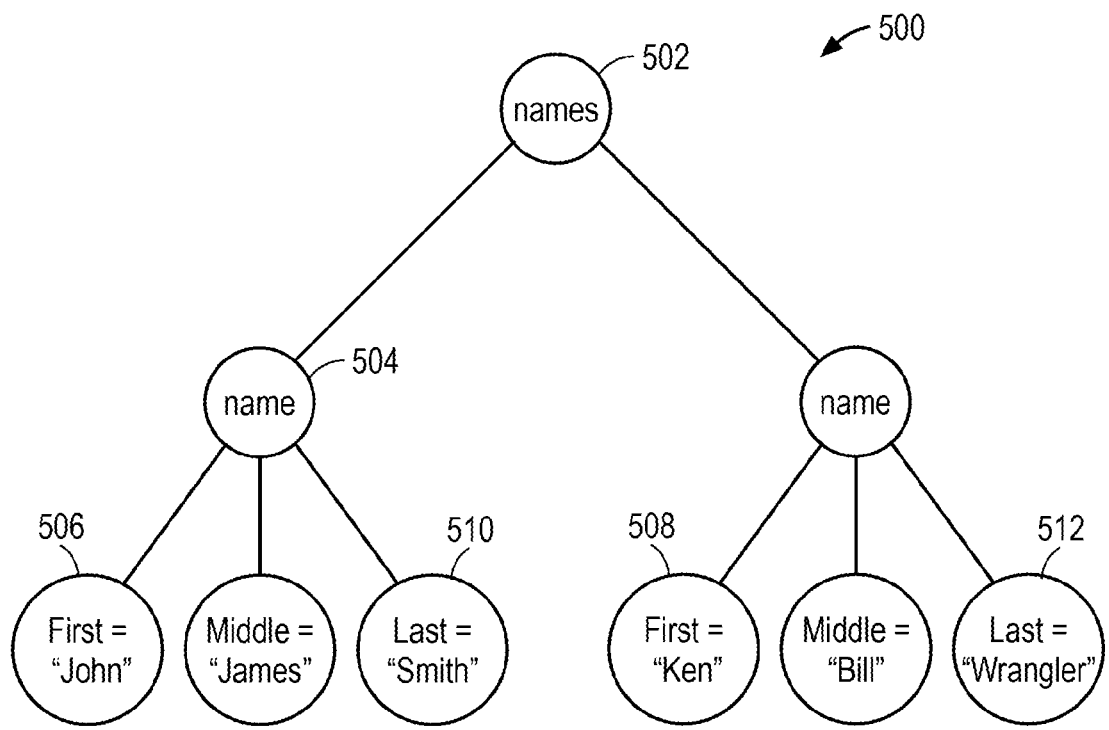
FIG. 4 is an exemplary markup language document that may be processed in accordance with the disclosed techniques.
FIG. 5 illustrates a tree structure associated with the document of FIG. 4.

The operations of the invention are more fully appreciated with some specific examples. FIG. 4 illustrates a document 400 that may be processed in accordance with an embodiment of the invention. The document 400 expresses a names structure that supports the definition of various names, including first, middle and last names. A tree structure characterizing this document is shown in FIG. 5. This tree structure naturally expresses parent, child, ancestor, descendent and sibling relationships. In this example, the following relationships exist: "first" is a sibling of "last", "first" is a child of "name", "middle is a descendent of "names" and "names" is an ancestor of "middle".

Various path expressions may be used to query the structure of FIG. 5. For example, a simple path may be defined as /names/name/first. A path with a predicate may be defined as /names/name[middle="James"]/first. A path with a wildcard may be expressed as /*/name/first, where * represents a wildcard. A path with a descendent may be express as //first.

The indices used in accordance with embodiments of the invention provide summaries of data stored in the database. The indices are used to quickly locate information requested in a query. Typically, indices store keys (e.g., a summary of some part of data) and the location of the corresponding data. When a user queries a database for information, the system initially performs index look-ups based on keys and then accesses the data using locations specified in the index. If there is no suitable index to perform look-ups, then the database system scans the entire data set to find a match.

User queries typically have two types of patterns including point searches and range searches. In a point search a user is looking for a particular value, for example, give me last names of people with first-name="John". In a range search, a user is searching for a range of values, for example, give me last names of people with first-name>"John" AND first-name<"Pamela".

Observe that the type of indices required for these two types of queries are different. Point search does not need keys in the index to be stored in a sorted order, but the range index must store sorted values. Database systems usually exploit this subtle difference for efficiently implementing the two types of indices. Range indices contain the entire range of values in a sorted order stored in a data structure that is more suitable for extracting ranges. These data-structures are accessed as in-memory data-structures using operating system virtual memory mechanism or by directly reading index files into memory. This enables use of standard search algorithms for fast look-ups in these data-structures. On the other hand, value indices are stored in structures that are efficient for insertion and retrieval of point value, such as hash tables. A path range index is a collection of sorted values, for example found in an XML document using a user specified path expression. It is useful for queries that search a range of values on a particular path in the database. Similarly other range indexes, such as an Element Range Index and a Field Range index are collections of sorted values from a particular element or a field.

The structure 500 of FIG. 5 is a tree representation of the XML document 400 of FIG. 4. A natural way of traversing trees is top-down, where one starts the traversal at the root node 502 and then visits the name node 504 followed by the first node 506. A path expression is a branch of a tree. An arbitrary branch of a tree may be used to form a pre-computed index.

Document trees may be traversed at various times, such as when the document gets inserted into the database and after an index look-up has identified the document for filtering. Paths are traversed at various times: (1) when a document is inserted into a database, (2) during index resolution to identify matching indices, (3) during index look-up to identify all the values matching the user specified path range and (4) during filtering. The pre-computed indices of the invention may be utilized during these different path traversal operations.

Top-down traversal can be viewed as forward traversal. The advantage of top-down traversal is that it is natural and starts with the first node in the document tree or path expression. The database system has to keep track of all the nodes traversed subsequently until the traversal hits a leaf. If there are multiple path indices defined in a system, the system has to traverse all the paths starting at the root to the leaf. This can be very inefficient when there are many paths with large depths. The state of the art implementations of path indices use top-down traversals. They are not only inefficient, but also have a limitation that each path must start from the root of a document. In contrast, the invention uses a combination of top-down document traversal and pre-computed indices for efficient document processing. The pre-computed indices may be used to support SQL queries, as demonstrated below. Thus, the invention provides high flexibility in path expression syntax and further provides higher performance than top-down path traversal techniques by simultaneously supporting SQL queries.

Various pre-computed indices may be used. The indices may be named based on the type of sub-structure used to create them. Embodiments of the invention utilize pre-computed element range indices, element-attribute range indices, path range indices, field range indices and geospatial range indices, such as geospatial element indices, geospatial element-attribute range indices, geospatial element-pair indices, geospatial element-attribute-pair indices and geospatial indices.

FIG. 6 illustrates an element range index 600 that may be used in accordance with an embodiment of the invention. The element range index 600 stores individual elements from the tree structured document 500. The element range index 600 includes value column 602, a document identifier column 604 and optional position information in the document 606. Entry "John" 608 corresponds to element 506 in FIG. 5, while entry "Ken" 610 corresponds to element 508 in FIG. 5.

FIG. 7 illustrates a field range index 700 that may be used in accordance with an embodiment of the invention. The field range index 700 stores values from the tree structured document 500. The field range index 700 includes a values column 702, a document identifier column 704 and optional position information in the document 706. Entry "John Smith" 708 is a value that corresponds to elements 506 and 510 of FIG. 5, while entry "Ken Wrangler" 710 is a value that corresponds to elements 508 and 512 in FIG. 5.

Figure 8:
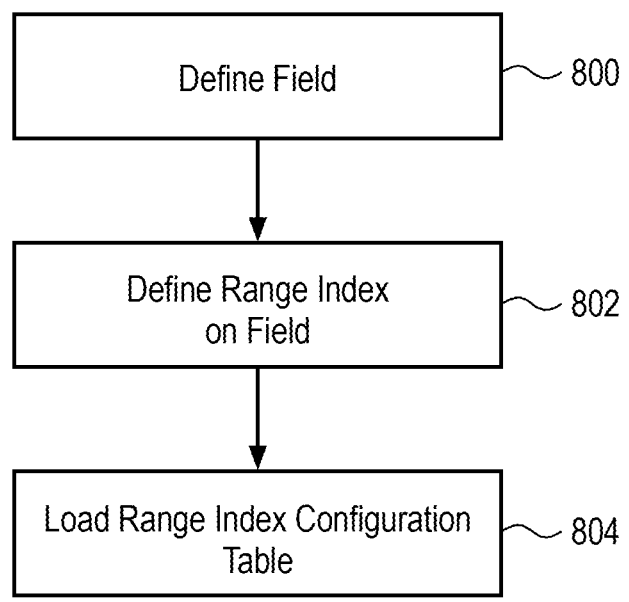
FIG. 8 illustrates processing operations associated with an embodiment of the invention.

Turning to FIG. 8, in accordance with an embodiment of the invention, a field for a range index is defined 800. A range index is then defined on the field 802. A range index configuration table 804 is then loaded 804.

FIG. 9 illustrates a range index configuration table 900 that may be used in accordance with an embodiment of the invention. In this embodiment, the range index configuration table 900 includes a range index configuration key column 902 and a range index specification column 1000. The various rows of the range index configuration key column 902 define different range index configuration keys. Each range index configuration key corresponds to a range index specification. The range index specification 910 defines metadata associated with a range of values.

Figure 10:
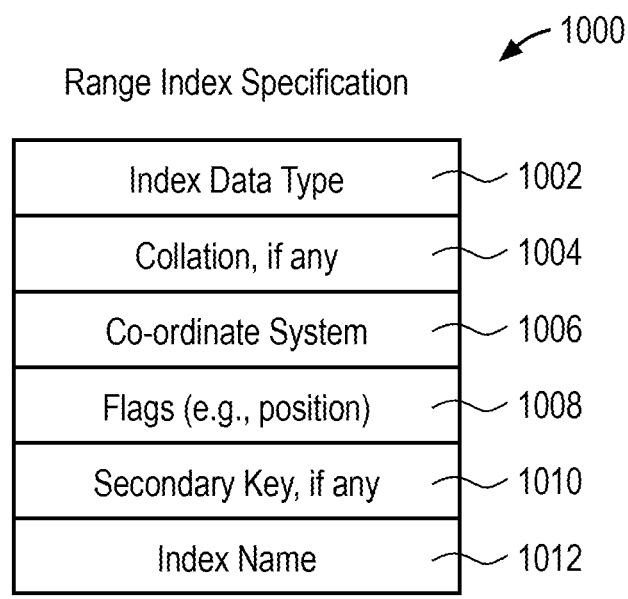
FIG. 10 illustrates a range index specification that may be utilized in accordance with an embodiment of the invention.

FIG. 10 illustrates an exemplary range index specification 1000, which includes an index data type 1002, collation specification, if any 1004, a coordinate system 1006, flags (such as position flags) 1008, a secondary key 1010, if any, and an index name 1012. The name index 1012 may be used as a shorthand reference to an entire index specification. For example, in a query that otherwise requires the specification of a data type, collation and flags, reference to the index name may be used instead of the explicit specification of the multiple elements.

A pre-computed index may be specified by a configuration file. The configuration file may be part of the parameter storage 210 of FIG. 2. The user interface 118 of FIG. 2 may also be used to define the configuration file. The following is an example of a configuration file. Annotations of the configuration file are demarked by ***.

```
<fields>  ***Field Definition. Typed range indices may be defined on
           various pieces of information in tree structured documents, such
           as elements, attributes, paths and composite fields. Typed range
           indices may be expressed on meta-data, such as document
           locators (Unique Resource Identifiers or URIs) and document
           collections. Included and excluded elements may be specified for
           composite fields. The elements can be identified using element
           names or path expressions or hierarchical relationships in the tree
           structured data. As discussed below, geospatial elements,
           geospatial element attributes, geospatial element pairs and
           geospatial element-attribute pairs may also be defined.***
    <field>
        <field-name>A-Name</field-name>
        <include-root>false</include-root>
        <included-elements>
            <included-element>
                <namespace-uri/>
                <localname>name</localname>
                <weight>1.0</weight>
                <attribute-namespace-uri/>
                <attribute-localname/>
                <attribute-value/>
            </included-element>
        </included-elements>
        <excluded-elements>
            <excluded-element>
                <namespace-uri/>
                <localname>middle</localname>
```

-continued

```
                <attribute-namespace-uri/>
                <attribute-localname/>
                <attribute-value/>
            </excluded-element>
        </excluded-elements>
    </field>
</fields>
<range-field-indexes>          *Range Index defined on field.*
    <range-field-index>
        <scalar-type>string</scalar-type>
        <collation>http://marklogic.com/collation/</collation>
        <field-name>A-Name</field-name>
        <range-value-positions>true</range-value-positions>
        <invalid-values>reject</invalid-values>
    </range-field-index>
</range-field-indexes>
<range-element-indexes>
    <range-element-index>      *** Range index on first element.***
        <scalar-type>dateTime</scalar-type>
        <namespace-uri>http://marklogic.com/xdmp/dls
        </namespace-uri>
        <localname>created replaced</localname>
        <collation/>
        <range-value-positions>false</range-value-positions>
        <invalid-values>reject</invalid-values>
    </range-element-index>
    <range-element-index>      *Range index on another element.*
        <scalar-type>unsignedLong</scalar-type>
        <namespace-uri>http://marklogic.com/xdmp/dls
        </namespace-uri>
        <localname>version-id</localname>
        <collation/>
        <range-value-positions>false</range-value-positions>
        <invalid-values>reject</invalid-values>
    </range-element-index>
    <range-element-index>      *Range index specifying "TITLE".*
        <scalar-type>string</scalar-type>
        <namespace-uri/>
        <localname>TITLE</localname>
        <collation>http://marklogic.com/collationk/collation>
        <range-value-positions>false</range-value-positions>
        <invalid-values>reject</invalid-values>
    </range-element-index>
    <range-element-index>      *Range index specifying "ALBUM".*
        <scalar-type>string</scalar-type>
        <namespace-uri/>
        <localname>ALBUM</localname>
        <collation>http://marklogic.com/collation/</collation>
        <range-value-positions>false</range-value-positions>
        <invalid-values>reject</invalid-values>
    </range-element-index>
</range-element-indexes>
<geospatial-element-indexes>       *** Geospatial range index.***
    <geospatial-element-index>
        <namespace-uri/>
        <localname>point</localname>
        <coordinate-system>wgs84</coordinate-system>
        <point-format>point</point-format>
        <range-value-positions>true</range-value-positions>
        <invalid-values>reject</invalid-values>
    </geospatial-element-index>
```

The following is an example of a document that contains geospatial information in element "point".

```
<root>
<basics>
<point>10,10</point>
<point>30,30</point>
<point>20,20</point>
<point>-20,-20</point>
</basics>
<complex>
<data><point>10,10</point></data>
<data><point>30,30</point></data>
<data><point>20,20</point></data>
<data><point>-20,-20</point></data>
```

-continued

```
</complex>
<pie>
<point >70,15</point>
<point >50,30</point>
<point >90,20</point>
<point >90,30</point>
<point >90,20</point>
<point >60,10</point>
</pie>
<orange>
<point >70,15</point>
<point >70,30</point>
<point >90,30</point>
<point >-90,30</point>
<point >90,20</point>
<point >-90 , 10</point>
</orange>
</root>
```

Efficient geospatial queries (e.g., a box, circle, polygon, lines) may be formed using range indexes on these points. For example, the system can find all data items that meet a geospatial constraint quickly by using the index to identify and fetch only matching items. For example, a query may specify all data items that contain the phrase "hello world" and contain a coordinate within 500 miles of latitude 10 degrees and longitude 24 degrees. The geospatial queries may be combined with SQL queries.

Table I illustrates how a set of columns associated with different range indices can be used together to form a dynamic view. That is, Table I illustrates how range indices are mapped to named, typed columns. A sequence of named, typed columns is combined into a named view. The indices are pre-computed, but the view is dynamic. Multiple views may be defined over the same set of columns.

TABLE I

View Name: Songs

| Uri (string) | Title (string) | Album (string) | Year (gYear) |
| --- | --- | --- | --- |

The following is an example of a configuration file that the database program may read in order to define a table view.

```
?xml version="1.0" encoding="UTF-8"?>
<view:view xmlns:view="http://marklogic.com/xdmp/view">
    <view:view-id>5423110979916486998</view:view-id>
    <view:view-name>songs</view:view-name>   *Table I named "Songs".*
    <view:element-scope>
        <view:namespace-uri/>
        <view:localname>SONG</view:localname>
    </view:element-scope>
    <view:ordered>false</view:ordered>
    <view:columns>
        <view:column>
            <view:column-name>uri</view:column-name>   *First column of Table I.*
            <cts:uri-reference xmlns:cts="http://marklogic.com/cts"/>
        </view:column>
        <view:column>
            <view:column-name>title</view:column-name>   ***Second column of
                                                            Table I.***
            <cts:element-reference xmlns:cts="http://marklogic.com/cts">
                <cts:namespace-uri/>
                <cts:localname>TITLE</cts:localname>
                <cts:scalar-type>string</cts:scalar-type>
                <cts:collation>http://marklogic.com/collation/</cts:collation>
            </cts:element-reference>
        </view:column>
        <view:column>
            <view:column-name>album</view:column-name>   ***Third column of
                                                            Table I.***
            <cts:element-reference xmlns:cts="http://marklogic.com/cts">
                <cts:namespace-uri/>
                <cts:localname>ALBUM</cts:localname>
                <cts:scalar-type>string</cts:scalar-type>
                <cts:collation>http://marklogic.com/collation/</cts:collation>
                <cts:nullable>true</cts:nullable>
            </cts:element-reference>
        </view:column>
        <view:column>
            <view:column-name>year</view:column-name>   ***Fourth column of
                                                           Table I.***
            <cts:element-reference xmlns:cts="http://marklogic.com/cts">
                <cts:namespace-uri/>
                <cts:localname>YEAR</cts:localname>
                <cts:scalar-type>gYear</cts:scalar-type>
            </cts:element-reference>
        </view:column>
    </view:columns>
</view:view>
```

The following is an example of a program statement that may be used to construct the dynamic view of Table I.

```
view:create("main", "songs",
view:element-view-scope(xs:QName("SONG")),
(
view:column("uri", cts:uri-reference( )), *First column of Table I.*
view:column("title", cts:element-reference(xs:QName("TITLE"))),
                              *Second column of Table I.*
view:column("album", cts:element-reference(xs:QName("ALBUM"),
                              *Third column of Table I.*
("nullable"))),
view:column("year", cts:element-reference(xs:QName("YEAR")))
                              *Fourth column of Table I.*
), ( )
)
```

Table I may now be queried using a simple SQL query, such as:

select title, album from songs
where songs match 'dream' and year<1990;

This query returns the title and album of any songs whose full text content including lyrics, which are not reflected in the range indexes/columns, matches 'dream' released before 1990. This query demonstrates constraining a view to a subset of documents in the database by specifying constraining queries based on a composition of multiple indices and random data (in this case, the text "dream") in the document, which, in this example, is not in the range indices. Thus, one achieves a very efficient full-text query with a SQL query.

The following is example song data where one will get a row from this document because "dreams" in the lyrics matches the full text query "dream" and the year of publication of this album is less than 1990.

```
<SONG>
<TITLE>MLK</TITLE>
<ALBUM>The Unforgettable Fire</ALBUM>
<YEAR>1984</YEAR>
<LINE>
Sleep, sleep tonight</LINE>
<LINE>
And may your dreams be realised</LINE>
<LINE>
If the thunder cloud passes rain</LINE>
<LINE>
So let it rain, rain down on he</LINE>
<LINE>
So let it be</LINE>
<LINE>
So let it be</LINE>
<LINE>
Sleep, sleep tonight</LINE>
<LINE>
And may your dreams be realised</LINE>
<LINE>
If the thunder cloud passes rain</LINE>
<LINE>
So let it rain, let it rain</LINE>
<LINE>
Rain down on he</LINE>
</SONG>
```

Thus, the foregoing SQL query relied upon the pre-computed indices used to form a view as manifested in Table I. The query also utilized a full text search to match the term "dream". Observe that this technique is different that prior art techniques. For example, one prior art technique ingests tree-structured data into a database and simultaneously tears down the structure to insert the data into flat tables. Thus, the data is stored in a form that is different than the original form. In contrast, the pre-computed indices of the invention allow tree structured data in their original form.

Another prior art technique defines a syntax for querying XML data in SQL. This technique dynamically forms tabular representations of the XML data in response to a query. Thus, each column and row is extracted out of documents using a column and row pattern implicated by the query. The same table is computed each time a user invokes the same query, resulting in poor performance. In contrast, the invention has pre-computed indices. Consequently, the only computation involved in response to a query is to select results matching the query and compute rows of results. The full text and SQL query of the foregoing example may be supplemented with a geospatial constraint.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other computer programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of operating a tree structured database, comprising:
    receiving a document;
    forming a top-down tree characterizing the document;
    generating pre-computed indices characterizing the document
    loading the top-down tree and pre-computed indices into a tree structured database;
    resolving a structured query language query against the tree structured database by temporarily forming a relational table, wherein subsets of the pre-computed indices are used to dynamically create the relational table, wherein the relational table is formed in response to the query and the information characterizing the document is retrieved from the document utilizing the pre-computed indices; and collecting data from the relational table in response to the structured query language query.

2. The method of claim 1 wherein the pre-computed indices are selected from an element range index, an element-attribute range index, a path range index, a field range index and a geospatial range index.

3. The method of claim 1 wherein the pre-computed indices define range indices on components of the top-down tree characterizing the document, wherein the components are selected from elements, attributes, paths, composite fields, geospatial elements, geospatial element attributes, geospatial element pairs and geospatial element-attribute pairs.

4. The method of claim 1 wherein the pre-computed indices define type range indices on metadata selected from document locators and document collections.

5. The method of claim 1 further comprising combining subsets of pre-computed indices based upon mapping indices to named, typed columns of the table of information.

6. The method of claim 1 wherein the pre-computed indices are defined in a configuration file.

7. The method of claim 6 wherein the configuration file specifies range indexes on composite fields and included and excluded elements in the composite fields.

8. The method of claim 6 wherein the configuration file identifies elements using at least one of element names, path expressions and hierarchical relationships in the top-down tree characterizing the document.

9. The method of claim 1 wherein the structured query language query includes a full text word query on the documents from which indexes are pre-computed.

10. The method of claim 1 wherein the tree structured database is a markup language database.

\* \* \* \* \*